United States Patent [19]
Krickl

[11] Patent Number: 5,454,594
[45] Date of Patent: Oct. 3, 1995

[54] INFLATABLE GAS BAG FOR VEHICLE OCCUPANT RESTRAINING SYSTEMS

[75] Inventor: Rudi Krickl, Schwäbisch Gmünd, Germany

[73] Assignee: TRW Repa GmbH, Alfdorf, Germany

[21] Appl. No.: 232,686

[22] Filed: Apr. 25, 1994

[30] Foreign Application Priority Data

Apr. 30, 1993 [DE] Germany .................. 43 14 347.4

[51] Int. Cl.6 ................................................ B60R 21/20
[52] U.S. Cl. ............................ 280/743.1; 280/728.1
[58] Field of Search ................. 280/743 R, 728 R; 383/3; 446/220, 221; 112/131, 153; 273/61 R, 61 C, 65 ED

[56] References Cited

U.S. PATENT DOCUMENTS

| | | | |
|---|---|---|---|
| 1,593,211 | 7/1926 | Faulkner et al. | 273/61 R |
| 1,960,803 | 5/1934 | Baumer | 273/65 ED |
| 2,210,954 | 6/1940 | Roberts | 273/61 R |
| 3,792,873 | 2/1974 | Buchner et al. | 280/743 R |
| 5,024,174 | 6/1991 | Ferguson | 112/121.24 |
| 5,094,477 | 3/1992 | Togawa | 280/743 R |
| 5,140,799 | 8/1992 | Satoh | 280/743 |
| 5,141,781 | 8/1992 | Yamamoto | 383/3 X |
| 5,193,847 | 3/1993 | Nakayama | 280/743 R X |

FOREIGN PATENT DOCUMENTS

| | | | |
|---|---|---|---|
| 0158442 | 6/1990 | Japan | 280/743 R |
| 5092746 | 4/1993 | Japan. | |
| 0011236 | 8/1888 | United Kingdom | 273/65 ED |

*Primary Examiner*—Mitchell J. Hill
*Assistant Examiner*—Christopher P. Ellis
*Attorney, Agent, or Firm*—Tarolli, Sundheim & Covell

[57] ABSTRACT

An inflatable gas bag (10) for vehicle occupant restraining systems comprises only two textile parts (14, 16) shaped to be developed in a plane the edges (18, 20) of which are joined together by a continuous seam (28). Of these textile parts (14, 16) one is generally club-shaped and the other is generally butterfly-shaped.

3 Claims, 3 Drawing Sheets

INFLATABLE GAS BAG FOR VEHICLE OCCUPANT RESTRAINING SYSTEMS

BACKGROUND OF THE INVENTION

The invention relates to an inflatable gas bag for vehicle occupant restraining systems comprising textile parts shaped to be developed in a single plane and stitched together.

A gas bag of this type is inflated within a few milliseconds if the vehicle is involved in a collision and serves to protect the occupants from impact injury. For optimum protection of vehicle occupants known gas bags assume a predetermined three-dimensional shape in the inflated condition. This three-dimensional shape may differ, depending on whether a gas bag is involved for the driver or for the front-seat passenger. In general the gas bags are made up of several textile parts stitched together by a plurality of seams. For example, a balloon-shaped gas bag is known which is made up of three flat fabric parts, i.e. an elongated web from which the casing part is formed and two disk-shaped end parts each of which are joined to the casing part by a seam.

SUMMARY OF THE INVENTION

The invention is based on the object of further developing an inflatable gas bag for vehicle occupant restraining systems so that a simplified fabrication thereof is possible.

This object is achieved for an inflatable gas bag for vehicle occupant restraining systems by the textile parts being formed by a maximum of two separate textile web sections, the edges of which are joined together by a continuous seam. In this way the textile parts can be easily fabricated by being cut to size from a gas bag fabric and are easy to handle in fabrication of the gas bag. The edges of the textile web sections assigned to each other are fed to a predetermined position of the sewing machine and stitched together in a single operation.

Development in this context is understood to be the length-consistent image of the gas bag surface resulting in the inflated condition in a plane with no stretching of material. For the three-dimensional shape resulting from the inflated gas bag the shaping of the gas bag limiting surface to be developed is formed by "slitting" along a suitably selected edge and "folding" in a plane.

In one embodiment of the invention the edges to be stitched together are formed curved throughout their length. Due to the resulting round seam profile the distribution of the forces to the seams can be optimized since these forces are no longer introduced via the seam exclusively perpendicular.

Wastage in cutting the wanted textile parts to size from a gas bag fabric can be reduced to a minimum for example by two textile web sections forming the gas bag. It is useful to arrange for one of the textile web sections to be generally club-shaped and the other to be butterfly-shaped.

To facilitate stitching, the start of the seam is marked at the two assigned edges of the separate textile web sections.

Depending on the particular application it proves useful that the two surface part members are made up of differing gas bag fabric.

BRIEF DESCRIPTION OF THE DRAWINGS

Further advantages of the invention will be appreciated from the following description of two embodiments and from the drawing to which reference is made and in which.

DESCRIPTION OF THE PREFERRED EMBODIMENT

Figure 1:
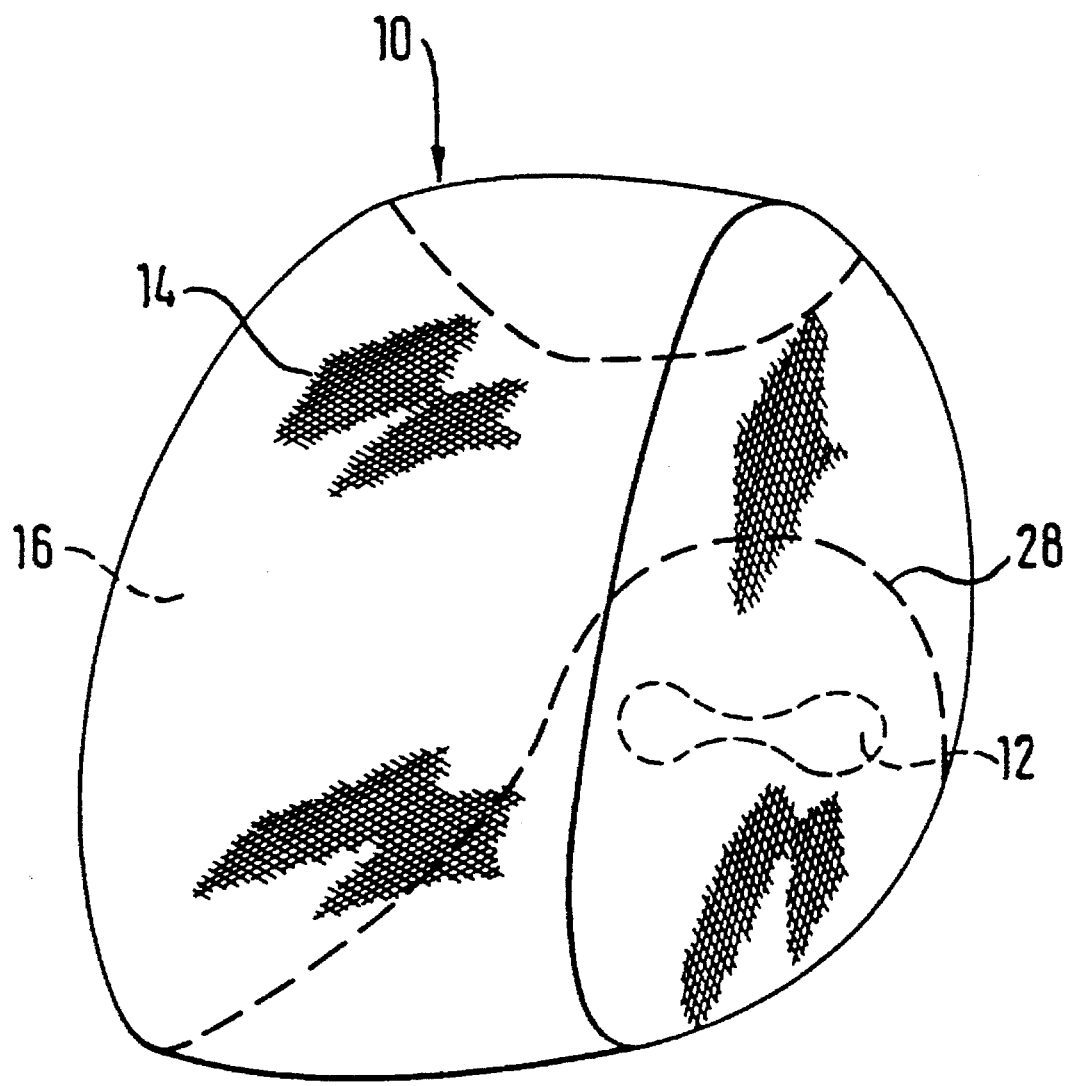
FIG. 1 is a schematic perspective view of a completely inflated gas bag according to a first embodiment of the present invention.

The gas bag 10 shown schematically in FIG. 1 in fully inflated condition belongs to a vehicle occupant restraining system and is connected by its inflation opening 12 to the housing of a conventional gas generator (not shown). The gas bag 10 comprises two textile web sections 14 and 16 which together form the three-dimensional developed shape of the inflated gas bag 10. The textile web section 14 is generally club-shaped and the textile web section 16 has in general a butterfly shape. The length of the edges 18 and 20 of the two textile web sections 14 and 16 is accordingly the same.

Figure 2:
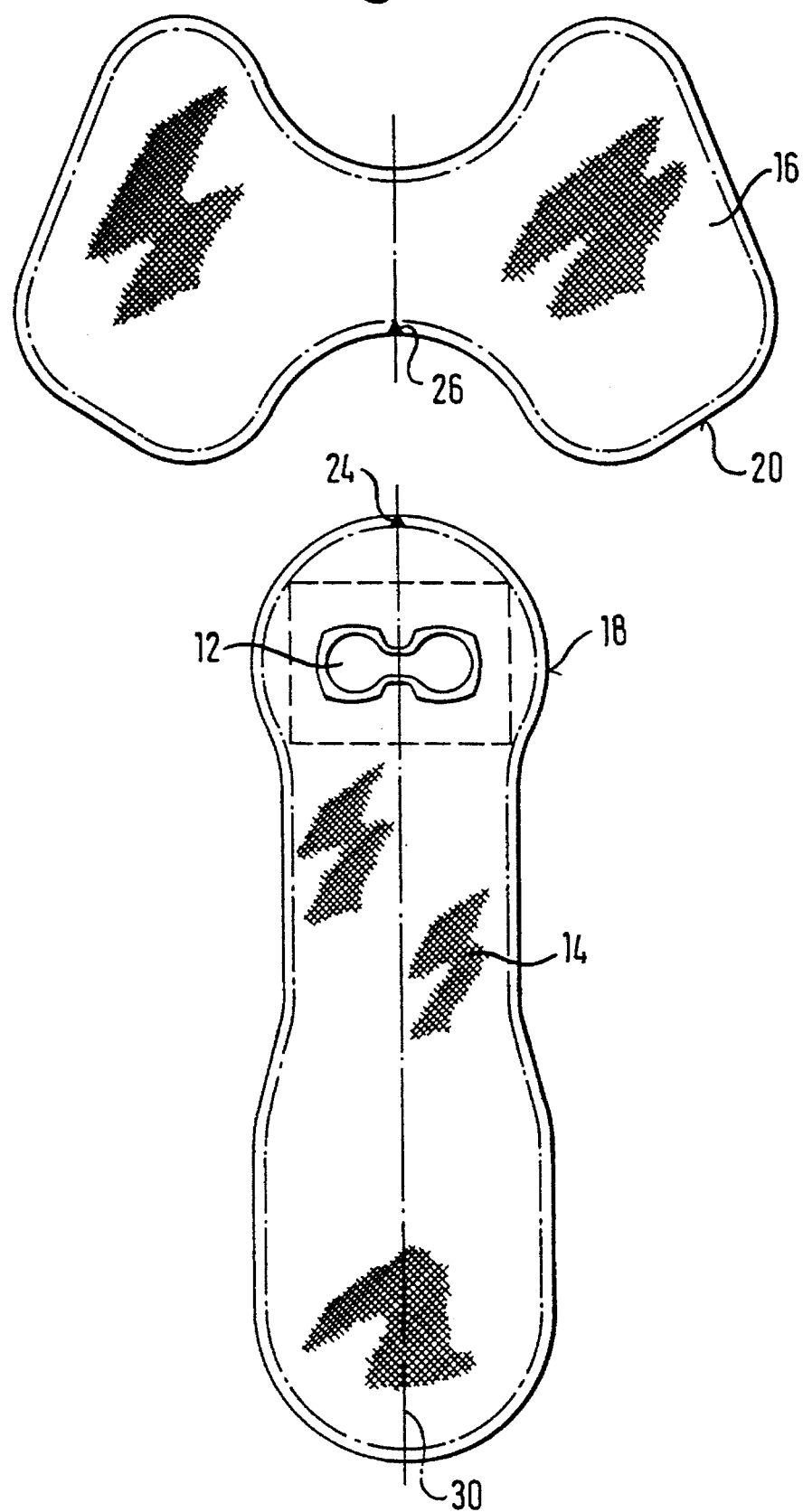
FIG. 2 shows two textile web sections of the gas bag of FIG. 1.

In the textile web section 14 the inflation opening 12 for the gas generator is provided (FIG. 2). In addition, both textile web sections 14 and 16 feature on their edges 18 and 20 a marking 24 and 26 respectively. When stitching the two textile web sections 14 and 16 together these markings 24, 26 are brought together at the edges 18 and 20 and thus form the starting and finishing point for the seam joining the two textile web sections 14 and 16. The seam starting point of the two markings 24 and 26 in contact with each other is located in the sewing machine and the edges 18 and 20 assigned to each other are stitched together on the basis of this marking in a single operation, i.e. without placement of a new seam. The two textile web sections 14 and 16 are formed symmetrical with respect to the axis 3 (FIG. 2).

As a result of the formation according to the invention both the number of the parts and the number of seams concerned can be reduced to advantage. Due to the two-part configuration as shown in FIGS. 1 and 2 a different gas bag fabric can be used for each textile web section 14, 16, for example, gas bag fabric of differing permeability to air and/or differing strength. Apart from this the two-part configuration of the textile web sections 14 and 16 of a developed three-dimensional shape formed by the inflated gas bag may be necesssary to minimize wastage of the gas bag fabric.

Figure 3:
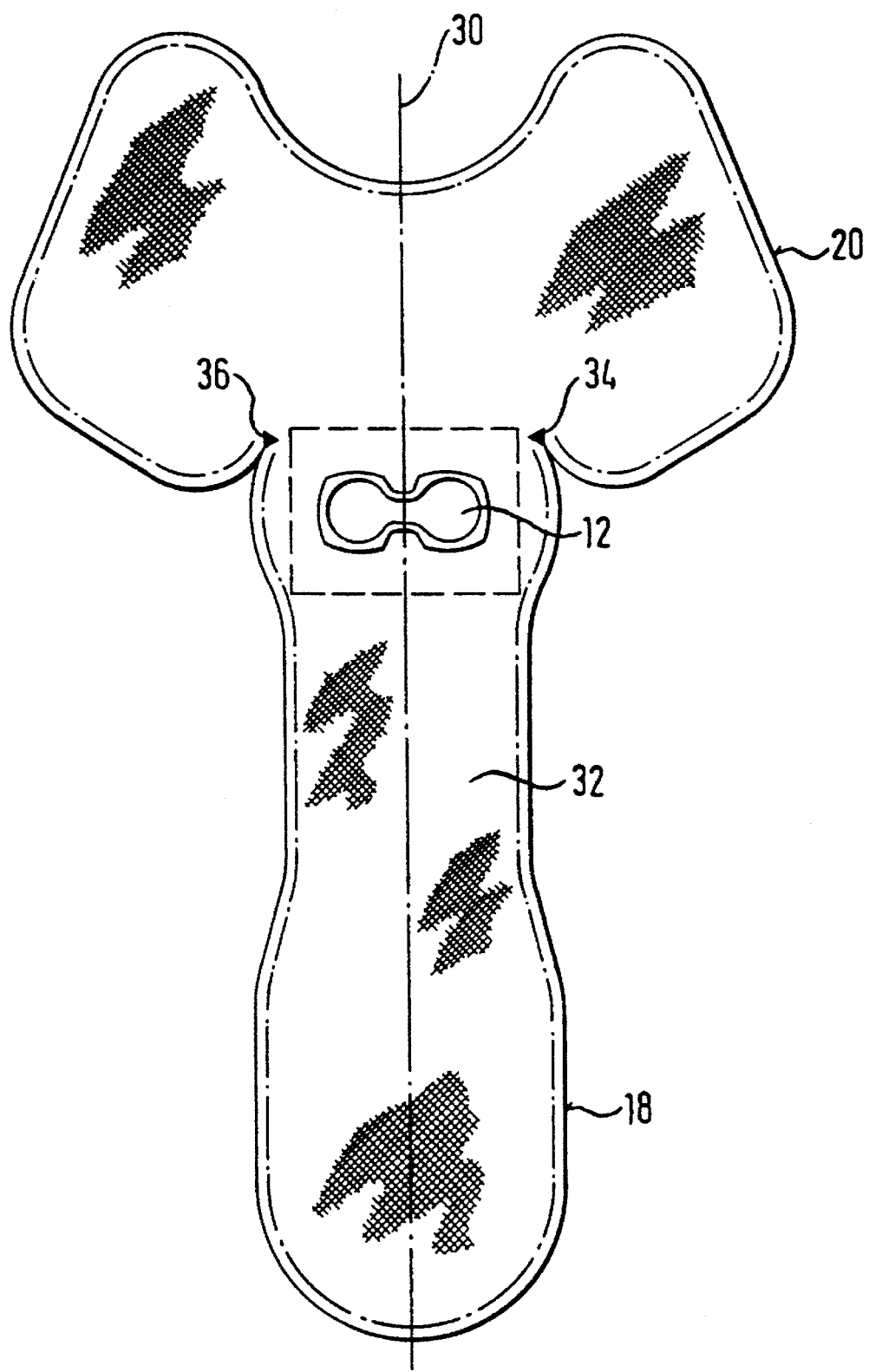
FIG. 3 shows a textile web section for a gas bag according to a further embodiment of the present invention.

In FIG. 3 a further textile web section 32 of another embodiment of the invention is shown. This textile web section 32 differs from that of the first embodiment in that it represents the three-dimensional developed shape of the inflated gas bag 10 in a single textile web section. This textile web section 32 is also formed symmetrical with respect to the axis 30 and features the inflation opening 12. The marking denoting the start of the seam is identified by the reference numeral 34, the marking denoting the end of the seam is identified by the reference numeral 36. In this embodiment too, the gas bag 10 can be fabricated with a single seam produced continuously in a single operation.

The edges 18, 20 of the two embodiments of the textile web sections 14, 16 or 32 to be stitched together are curved in their profile resulting in a curved seam 28. Due to the curved seam profile the distribution of the forces in the seam is optimized since the forces can now be introduced into the textile web section 14, 16 or 32 via the seam differingly inclined.

The principle according to the invention achieves a variety of shapes of planar surface fabric parts which form the developed shape of differing three-dimensional configurations of inflated gas bags.

What is claimed is:

1. An inflatable gas bag for a vehicle occupant restraining system consisting of a first textile part which is flat when laid down onto a plane and which is generally butterfly-shaped, with a pair of wings interconnected by a narrow center portion, each wing having an edge defining a pair of opposed lobes of different width, size and shape, and a second textile part of an elongate shape which is flat when laid down onto a plane and which is generally club-shaped, with a pair of opposed lobes connected by a narrow neck portion, one of said lobes having an elongate shape and the other of said lobes having an inflation opening therein, said first textile part having an edge extending substantially around said first textile part, said second textile part having an edge extending substantially around said second textile part with a length approximately equal to a length of said edge of said first textile part, and said edges of said first and second textile parts being connected by a continuous seam extending along said edges.

2. The gas bag of claim 1, wherein said first and second textile parts are made of different textile fabric materials.

3. The gas bag of claim 1, wherein said seam has a start which is marked on both of said edges of said first and second textile parts.

* * * * *